Nov. 19, 1940.       E. C. WHITE       2,221,888
MIRROR SIGN
Filed July 28, 1939
Fig.1.
Fig.2.
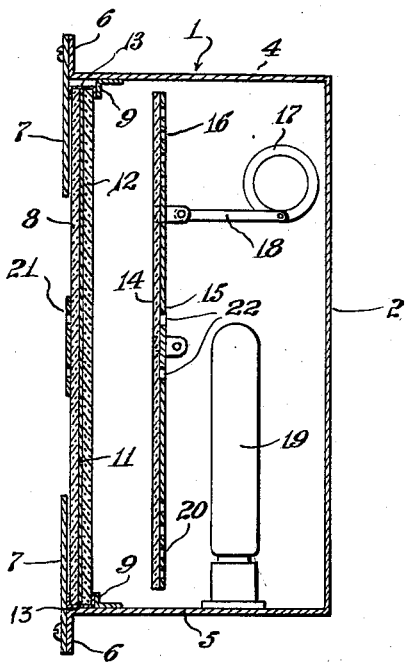
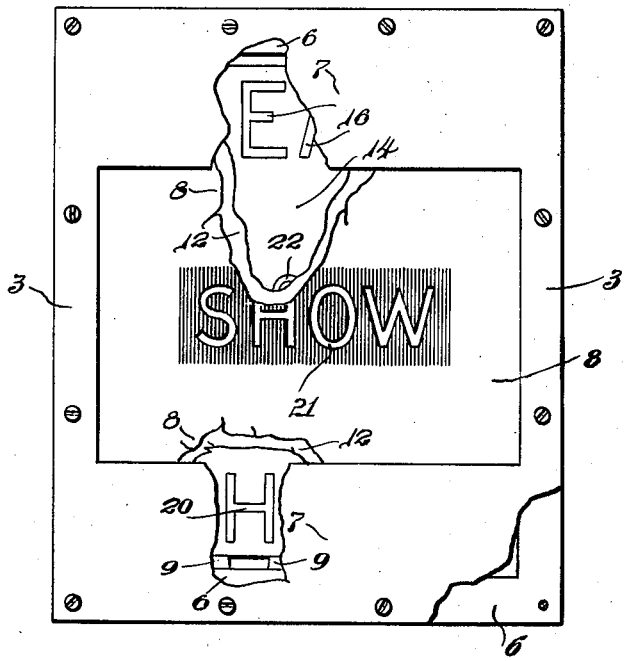
INVENTOR
Ernest Cantelo White
BY
Joseph F. Ebert
ATTORNEY Patented Nov. 19, 1940

2,221,888

UNITED STATES PATENT OFFICE 2,221,888

MIRROR SIGN

Ernest Cantelo White, Bronxville, N. Y., assignor to Multi Vue Signs Company, Incorporated, New York, N. Y., a corporation of New York Application July 28, 1939, Serial No. 287,102

6 Claims. (Cl. 40—132)

The present invention relates to improvements in a mirror sign capable of producing multiple images, and is a companion case to my application filed concurrently herewith and bearing Serial Number 287,101.

There are two general types of signs of this character; one in which the images do not appear to move, as disclosed, for example, in U. S. Letters Patent 1,202,593, issued Oct. 24, 1916, to George McI. Scott, and the other in which the images appear to move, as exemplified in U. S. Letters Pat. 2,132,472, issued Oct. 11, 1938, to Norman En Holm.

Both types of signs embody a so-called "transparent mirror" and an opaque mirror, one or both of the mirrors being provided with indicia. The essential dfference between the two kinds of signs is, in one the mirrors are not in motion, and in the other they are caused to assume varying relative angular positions because of a continuous relative motion between the mirrors or between the mirrors and the support therefor.

It is an object of the present invention to utilize a light-intercepting means in the type of sign which has one of the mirrors movable with respect to the other, whereby the appearance and disappearance of the multiple reflections may be controlled both with respect to their sequence of appearance and their location within predetermined areas of the transparent mirror.

Another object is the provision of what may be termed disappearing indicia, which are normally invisible from the front of the sign, reflections of which only become visibile during a portion of the cycle of oscillation of the mirror.

Another object of the invention is so arranging sets of indicia that the several sets alternately become visible and invisible during different periods of the cycle of oscillation.

Another object is the provision of permanently visible indicia, combined with animated indicia when the sign is lighted, without a confused presentation of the two sets of indicia, and with the advantage of utilizing the same illuminating means for both.

Other novel details of construction and arrangement of parts which are exemplified in the accompanying drawing and manifested from the following description are additional objects of the invention.

In the accompanying drawing:

Fig. 1 is a vertical sectional view of a sign embodying the invention, including a cabinet, and illustrating means for oscillating the opaque mirror; and Fig. 2 is a front elevation of the cabinet showing the transparent mirror.

Referring to the accompanying drawing, there is shown a casing 1 having a rear wall 2, side walls 3 and 4 and top and bottom 4 and 5, respectively. The sides, top and bottom are provided with flanges 6, against which fits a frame 7 for holding a front transparent mirror 8 in position to close the open front of the casing 1. The mirror 8 abuts against an internal depending flange 9, thus limiting its movement rearwardly. It will be noted that the top and bottom of the frame 7 are considerably wider than the sides, and the object of this will be apparent as the description proceeds.

As it is well known in the art, a transparent mirror comprises a sheet of glass having a thin coating 11 of silver on its rear face, which coating is sufficiently thin to pass transmitted light, but capable of forming a reflecting surface by reflected light. To protect the silver coating on the transparent mirror 8, it is covered with a sheet of clear glass 12, the mirror 8 and the cover glass 12 being bound together around their marginal edges with thin adhesive tape 13.

Forming part of the mirror system is an opaque mirror 14, provided with a thick silvered coating 15 on its rear face, which is non-transparent to transmitted light. The opaque mirror 14 may be treated in any desired manner to produce indicia visible when illuminated. One well known method of providing the mirror 14 with indicia of this character is by the so-called "silk screen" process, which is employed to remove portions of the silver coating 15 and to apply a transparent or translucent color to the removed or cut-out portions. As this feature is no part of the present invention, further description thereof is deemed unnecessary. Suffice it to say that in the present instance the opaque mirror 14 is provided with indicia 16 along its top and indicia 20 along its bottom marginal edges.

The indicia 16 and 20 do not extend beyond the top and bottom flanges, respectively, of the frame 7, so that normally they are concealed from the front of the sign. If desired, an opaque non-transparent coating could be applied either to the front or rear marginal edges of the transparent mirror 8 and serve as a substitute for the extended top and bottom portions of the frame 7. However, I have found that whenever clear and rapidly disappearing indicia is desired, the best results may be obtained by placing the non-transparent coating on the front of the transparent mirror, and simplicity of construction dictates that this be accomplished by making the frame 7 wider at the top and bottom. The silver coating 15 on the opaque mirror 14 intermediate the concealed lines of indicia 16 is left uninterrupted, thus forming an opaque reflecting surface for the oppositely disposed corresponding portion of the transparent mirror 8.

The opaque mirror 14 is pivotally mounted to move about a horizontal axis, and any suitable means such as a small electric motor 17 may be employed to oscillate the same. The motor 17 may be mounted within the casing 1 in any approved fashion and is connected to the mirror 14 by a crank 18 having one of its ends connected to an eccentric driven by the motor, and the other end secured to the mirror.

For the purpose of illuminating the sign, a lamp 19 is located behind the opaque mirror 14. The gear ratio of the motor is such that the crank will operate at the proper speed to produce the desired rate of oscillation of the mirror. The motor 17 and the lamp 19 are preferably included in the same electrical circuit, so that when the sign is illuminated, the mirror 14 is oscillated.

From the foregoing it will be obvious that when the opaque mirror 14 is oscillated in one direction, the indicia 16 at the top of the mirror are multiply reflected downwardly to fill the entire space of the sign. When oscillated in the other direction, the bottom indicia 20 are multiply reflected upwardly to fill the entire space of the sign. It will also be apparent that two different sets of moving indicia which appear and disappear alternately are provided, and these indicia need have no relation to one another, and therefore may be totally different, as only one appears at a time.

Indicia 21 may be applied to the outer face of the transparent mirror 8, which would be constantly visible irrespective of whether or not the sign is illuminated. Such indicia may also be translucent and in a form to constitute a screen for other translucent indicia in the rear opaque mirror 14 as indicated by the numeral 22. The indicia 21 may consist of a translucent pigment applied to form the indicia and other translucent pigment to form a background therefor, both of which may be conveniently applied by the so-called "silk screen" process. In such form light transmitted through indicia 22 will illuminate indicia 21, and the multiple images of indicia 22 will appear and disappear periodically above or below indicia 21, or both, depending on the extent of relative oscillation of the mirrors. The indicia 22 may be formed on the rear surface of the opaque mirror 14 by the same process, heretofore described, as employed in applying indicia 16 and 20.

Either of indicia 16 or 20, together with the outside indicia 21 and inside indicia 22 may be omitted entirely, in which case the sign will appear as an ordinary mirror during half or more of the cycle, and be filled with moving reflections of the remaining indicia during the remainder of each cycle.

It will thus be seen that the invention in its simplest aspects contemplates a mirror sign of the animated type, having sets of disappearing indicia, each set being visible alternately, but normally entirely concealed for part of the cycle of operation, and so multiplied during the remainder of the cycle as to fill any desired portion of the sign; further, that when the center portion of the opaque mirror carries no indicia, the fact that it is opaque effects an apparent opaque mirror on that portion of the transparent mirror immediately in front thereof whenever the opposed reflecting surfaces of the two mirrors are substantially parallel.

It is obvious that the disappearing and reappearing indicia may be located at either or both sides of the sign and the moving mirror be oscillated on a vertical axis, in which case similar effects will be produced in horizontally moving reflections.

Although these and other changes may be made by those skilled in the art without departing from the spirit of my invention, nevertheless it is my desire to cover all such changes and modifications as come within the appended claims.

As a modification, a non-transparent, non-reflecting coating may be applied directly to the transparent mirror 8 instead of extending the top and bottom of the non-reflecting frame 7 over a substantial margin of the mirror 7, as illustrated, and it is therefore desired that in interpreting the appended claims all such modifications be regarded as equivalent structures.

What is claimed is:

1. In a sign of the class described, a support, a front mirror and a rear mirror carried by the support and having opposed reflecting surfaces, a screen in front of a portion of the reflecting surface of said front mirror, another portion of said front mirror being transparent, indicia facing one of said opposed reflecting surfaces and concealed by said screen, means for illuminating said indicia, and means for imparting to one of said mirrors a periodic motion of sufficient amplitude to make multireflected images of said indicia visible through said transparent portion of the front mirror during a portion of each period of said motion.

2. A sign as described in claim 1 in which permanently visible translucent indicia form a part of said screen and are illuminated by light derived from said illuminating means.

3. In a sign of the class described having a casing, a mirror system comprising a front transparent mirror and a rear opaque mirror supported in said casing, means for causing a relative motion between said mirrors to cause the opposed reflecting surfaces of said mirrors to assume varying relative angular positions, indicia facing one of said opposed reflecting surfaces and a screen covering the portion of said transparent mirror opposed to said indicia, the extent of said screen being limited sufficiently to reveal multiple reflections of said indicia in some of the said relative angular positions of said mirrors.

4. A sign as described in claim 3 in which the said screen is formed as an integral part of said casing.

5. In a sign of the class described, a support, a front transparent mirror and a rear opaque mirror carried by the support, said mirrors having opposed reflecting surfaces, an opaque non-reflecting surface opposing one of said reflecting surfaces, translucent indicia forming part of the rear face of said opaque mirror and displaced with respect to said non-reflecting surface, means for illuminating said indicia, and means for oscillating one of said mirrors, whereby the reflections of said indicia will appear and disappear without said opaque non-reflecting surface.

6. In a sign of the class described having a casing, a front transparent mirror and a rear opaque mirror supported in said casing, means for causing a relative motion between said mirrors to cause the opposed surfaces of said mirrors to assume varying relative angular positions, one of said mirrors having its opposed reflecting surface diminished by a non-reflecting surface, said non-reflecting surface carrying indicia which produces reflections visible through the transparent mirror only during a portion of the oscillating cycle of said mirrors, and means for illuminating said indicia.

ERNEST CANTELO WHITE.